United States Patent
Kondo et al.

(10) Patent No.: US 10,333,139 B2
(45) Date of Patent: Jun. 25, 2019

(54) NEGATIVE ELECTRODE ACTIVE MATERIAL, METHOD FOR PRODUCING SAME, AND ELECTRICAL STORAGE DEVICE

(71) Applicant: KABUSHIKI KAISHA TOYOTA JIDOSHOKKI, Kariya-shi, Aichi (JP)

(72) Inventors: Takeshi Kondo, Kariya (JP); Tomohiro Niimi, Kariya (JP); Yusuke Sugiyama, Kariya (JP); Masataka Nakanishi, Kariya (JP); Nobuhiro Goda, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 197 days.

(21) Appl. No.: 15/106,397

(22) PCT Filed: Nov. 14, 2014

(86) PCT No.: PCT/JP2014/005734
§ 371 (c)(1),
(2) Date: Jun. 20, 2016

(87) PCT Pub. No.: WO2015/097974
PCT Pub. Date: Jul. 2, 2015

(65) Prior Publication Data
US 2017/0033355 A1 Feb. 2, 2017

(30) Foreign Application Priority Data
Dec. 25, 2013 (JP) .................... 2013-267528

(51) Int. Cl.
*H01M 4/36* (2006.01)
*H01G 11/34* (2013.01)
(Continued)

(52) U.S. Cl.
CPC ............ *H01M 4/366* (2013.01); *H01G 11/24* (2013.01); *H01G 11/30* (2013.01); *H01G 11/34* (2013.01);
(Continued)

(58) Field of Classification Search
None
See application file for complete search history.

(56) References Cited

U.S. PATENT DOCUMENTS 6,733,922 B2 5/2004 Matsubara et al.
9,663,860 B2 5/2017 Yang et al.
(Continued)

FOREIGN PATENT DOCUMENTS

CN 1374712 A 10/2002
CN 102157731 A 8/2011
(Continued)

OTHER PUBLICATIONS

Kumai et al., "Si—C composite anode of layered polysilane (Si6H6) and sucrose for lithium ion rechargeable batteries." J. Mater. Chem 2011, 21, 11941. (Year: 2011).*
(Continued)

*Primary Examiner* — Alix E Eggerding
(74) *Attorney, Agent, or Firm* — Sughrue Mion, PLLC

(57) ABSTRACT

Provided is a negative electrode active material including complex particles formed of: nano silicon aggregated particles produced by heating a layered polysilane represented by a composition formula of $(SiH)_n$ and having a structure in which multiple six-membered rings formed from silicon atoms are connected; and a composited carbon layer formed from an amorphous carbon and at least covering one portion of the aggregated particles. A mean particle diameter $D_{50}$ of the aggregated particles is within a range of 0.2 μm to 30 μm, (Continued)

and a mean particle diameter $D_{50}$ of the complex particles is within a range of 0.5 μm to 40 μm.

18 Claims, 2 Drawing Sheets

(51) Int. Cl.
| | |
|---|---|
| H01M 4/04 | (2006.01) |
| H01M 4/1395 | (2010.01) |
| H01M 4/38 | (2006.01) |
| H01M 4/587 | (2010.01) |
| H01G 11/24 | (2013.01) |
| H01G 11/30 | (2013.01) |
| H01G 11/86 | (2013.01) |
| H01M 4/133 | (2010.01) |
| H01M 4/134 | (2010.01) |
| H01M 4/1393 | (2010.01) |
| H01M 10/0525 | (2010.01) |
| H01M 4/48 | (2010.01) |
| H01M 10/052 | (2010.01) |
| H01M 12/00 | (2006.01) |
| H01M 4/02 | (2006.01) |

(52) U.S. Cl.
CPC .......... *H01G 11/86* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 10/0525* (2013.01); *H01M 4/483* (2013.01); *H01M 10/052* (2013.01); *H01M 12/005* (2013.01); *H01M 2004/021* (2013.01); *H01M 2004/027* (2013.01); *Y02E 60/13* (2013.01); *Y02T 10/7022* (2013.01)

(56) References Cited

U.S. PATENT DOCUMENTS

| | | |
|---|---|---|
| 2001/0012503 A1 | 8/2001 | Fukuoka et al. |
| 2002/0164479 A1* | 11/2002 | Matsubara ............ H01M 4/362 |
| | | 428/367 |
| 2004/0166046 A1 | 8/2004 | Fukuoka et al. |
| 2009/0093356 A1 | 4/2009 | Yamamoto |
| 2014/0147751 A1 | 5/2014 | Yang et al. |

FOREIGN PATENT DOCUMENTS

| | | |
|---|---|---|
| JP | 3865033 B2 | 1/2007 |
| JP | 2008235247 A | 10/2008 |
| JP | 2009-102219 A | 5/2009 |
| JP | 2011-90806 A | 5/2011 |
| JP | 2012-059509 A | 3/2012 |

OTHER PUBLICATIONS

Kumai et al. "Characteristics and strucutral change of layered polysilane (Si6H6) anode for lithium ion batteries." Journal of Power Sources 196 (2011) 1503-1507. (Year: 2011).*

Yoko Kumai et al., "Si—C composite anode of layered polysilane ($Si_6H_6$) and sucrose for lithium ion rechargeable Batteries", Journal of Materials Chemistry, 2011, vol. 21, pp. 11941-11946.

H.D. Fuchs et al., "Porous silicon and siloxene: Vibrational and structural properties", Physical Review B, Sep. 15, 1993, pp. 8172-8189, vol. 48, No. 11.

The Second Office Action dated Aug. 22, 2018 from the State Intellectual Property Office of the P.R.C. in counterpart application No. 201480070599.4.

Communication dated Mar. 21, 2019, from the State Intellectual Property Office of the P.R.C in counterpart application No. 201480070599.4.

* cited by examiner

NEGATIVE ELECTRODE ACTIVE MATERIAL, METHOD FOR PRODUCING SAME, AND ELECTRICAL STORAGE DEVICE

CROSS REFERENCE TO RELATED APPLICATIONS

This application is a National Stage of International Application No. PCT/JP2014/005734 filed Nov. 14, 2014, claiming priority based on Japanese Patent Application No. 2013-267528 filed Dec. 25, 2013, the contents of all of which are incorporated herein by reference in their entirety.

TECHNICAL FIELD

The present invention relates to a negative electrode active material used in electrical storage devices such as a lithium ion secondary battery, a method for producing the negative electrode active material, and an electrical storage device such as a lithium ion capacitor, an electric double layer capacitor, and a secondary battery using the negative electrode active material.

BACKGROUND ART

Lithium ion secondary batteries are secondary batteries having a high charge/discharge capacity and capable of achieving high output. Currently, lithium ion secondary batteries are mainly used as power supplies and the like for portable electronic equipment, and are expected to be used as power supplies for electric vehicles assumed to be used widely in the future. Lithium ion secondary batteries have, respectively in a positive electrode and a negative electrode, active materials capable of inserting and eliminating lithium (Li) ions therein/therefrom. The lithium ion secondary batteries operate when lithium ions move through an electrolytic solution provided between the two electrodes.

In lithium ion secondary batteries, a lithium-containing metallic complex oxide such as a lithium cobalt complex oxide is mainly used as the active material for the positive electrode, and a carbon material having a multilayer structure is mainly used as the active material for the negative electrode. The performance of a lithium ion secondary battery is influenced by materials of the electrolyte and the positive and negative electrodes included in the secondary battery. Research and development are actively conducted for a substance for the active materials. For example, usage of silicon or silicon oxide having a higher capacity (capable of inserting and eliminating a large amount of lithium ions) than carbon is discussed as a substance for the negative electrode active material.

When silicon is used as the negative electrode active material, a battery with a capacity higher than when a carbon material is used is obtained. However, silicon undergoes a large volume change associated with occlusion and release of Li during charging and discharging. Since silicon turns into a fine powder and becomes eliminated or detached from a current collector as a result, a battery using silicon as the negative electrode active material has a problem regarding having a short charge/discharge cycle life. Thus, by using a silicon oxide as the negative electrode active material, the volume change of the negative electrode active material associated with occlusion and release of Li during charging and discharging is suppressed better than when silicon is used.

For example, usage of a silicon oxide ($SiO_x$: x is about $0.5 \leq x \leq 1.5$) is discussed as the negative electrode active material. $SiO_x$, when being heated, is known to decompose into Si and $SiO_2$. This is referred to as a disproportionation reaction in which a solid separates into two phases, i.e., Si phase and $SiO_2$ phase, through an internal reaction. The Si phase obtained from the separation is extremely fine. In addition, the $SiO_2$ phase that covers the Si phase has a function of suppressing decomposition of the electrolytic solution. Thus, the secondary battery using the negative electrode active material formed of $SiO_x$ that has been decomposed into Si and $SiO_2$ has excellent cycle characteristics.

The cycle characteristics of the secondary battery improve further when the secondary battery uses, as the negative electrode active material, finer silicon particles forming the Si phase of the $SiO_x$ described above. JP3865033 (B2) (Patent Literature 1) discloses a method of heating metal silicon and $SiO_2$ to sublimate those into a silicon oxide gas, and cooling the gas to produce $SiO_x$. With this method, the particle size of the silicon particles forming the Si phase can be set to a nano size level of 1-5 nm.

JP2009102219 (A) (Patent Literature 2) discloses a production method including decomposing a silicon raw material into an elemental state in a high temperature plasma, rapidly cooling that to the temperature of liquid nitrogen to obtain silicon nano particles, and fixing the silicon nano particles into a $SiO_2$—$TiO_2$ matrix by using a sol-gel method or the like.

In the production method according to Patent Literature 1, the matrix is limited to those that are sublimatable. In addition, in the production method according to Patent Literature 2, high energy for plasma discharge is required. Furthermore, silicon complexes obtained from these production methods have a flaw regarding the silicon particles of the Si phase having low dispersibility and being easily aggregated. When the Si particles aggregate with each other and the particle size thereof becomes large, the secondary battery using that as the negative electrode active material results in having a low initial capacity and deteriorated cycle characteristics.

In recent years, nano silicon materials that are expected for usage in semiconductors, electrics or electronics fields, and the like have been developed. For example, Physical Review B (1993), vol. 48, 8172-8189 (Non-Patent Literature 1) discloses a method for synthesizing a layered polysilane by causing a reaction between hydrogen chloride (HCl) and calcium disilicide ($CaSi_2$), and describes that the layered polysilane obtained in this manner can be used in a light-emitting element or the like.

JP2011090806 (A) (Patent Literature 3) discloses a lithium ion secondary battery using a layered polysilane as the negative electrode active material.

CITATION LIST

Patent Literature

Patent Literature 1: JP3865033 (B2)
Patent Literature 2: JP2009102219 (A)
Patent Literature 3: JP2011090806 (A)

Non-Patent Literature

Non-Patent Literature 1: Physical Review B (1993), vol. 48, 8172-8189

SUMMARY OF INVENTION

Technical Problem

The negative electrode active material formed of the layered polysilane described in Patent Literature 3 has a flaw of not being preferable as a substance for the negative electrode active material of a secondary battery since having a large BET specific surface area. For example, when the BET specific surface area of the negative electrode active material is large in the negative electrode of a lithium ion secondary battery, achieving a high capacity is difficult since decomposition of the electrolytic solution is accelerated and the irreversible capacity consumed at the negative electrode becomes large. In addition, a problem regarding low cycle characteristics of the lithium ion secondary battery exists, since SEI occurs easily at the negative electrode.

The present invention has been made in view of the above described situation, and the problem to be solved is to provide a negative electrode active material capable of reducing the irreversible capacity and suppressing generation of SEI, and an electrical storage device using the negative electrode active material in the negative electrode.

Solution to Problem

The negative electrode active material of the present invention solving the above described problem includes complex particles formed of: nano silicon aggregated particles produced by heating a layered polysilane represented by a composition formula of $(SiH)_n$ and having a structure in which multiple six-membered rings formed from silicon atoms are connected; and a composited carbon layer formed from an amorphous carbon and at least covering one portion of the aggregated particles. A mean particle diameter $D_{50}$ of the aggregated particles is within a range of 0.2 μm to 30 μm, and a mean particle diameter $D_{50}$ of the complex particles is within a range of 0.5 μm to 40 μm.

The production method according to the present invention includes the following steps to be performed in the following order: an aggregated particle formation step of obtaining nano silicon aggregated particles by heating a layered polysilane represented by a composition formula of $(SiH)_n$ and having a structure in which multiple six-membered rings formed from silicon atoms are connected; a grinding step of grinding the aggregated particles to a mean particle diameter $D_{50}$ not larger than 30 μm into fine aggregated particles; a carbonization step of mixing the fine aggregated particles and a resin solution, and removing the solvent, and carbonizing the resin.

An electrical storage device according to the present invention includes a negative electrode containing the negative electrode active material of the present invention.

Advantageous Effects of Invention

In the negative electrode active material of the present invention, the complex particles in which at least one portion of the nano silicon aggregated particles is covered with the carbon layer formed from an amorphous carbon are included. As a result, the decomposition of the electrolytic solution is suppressed, the irreversible capacity is reduced, and the aggregated particles is suppressed from turning into fine powder because of repeated expansion and contraction during charging and discharging in an electrical storage device. As a result, cycle characteristics improve since the increase in the specific surface area on the negative electrode is suppressed and the generation of SEI is also suppressed.

As a result of having the mean particle diameter $D_{50}$ of the aggregated particles within a range of 0.2 μm to 30 μm and the mean particle diameter $D_{50}$ of the complex particles within a range of 0.5 μm to 40 μm; excellent coatability when the complex particles are applied on a current collector to form a negative electrode active material layer is obtained, and a stable negative electrode active material is formed. In addition, when the negative electrode active material is used for the negative electrode of an electrical storage device, initial capacity and cycle characteristics further improve.

Furthermore, in the production method according to the present invention, the carbonization step is performed after the aggregated particles are ground into fine aggregated particles. Thus, the carbon layer is easily formed on nearly all surfaces of the fine aggregated particles, and, when the aggregated particles are used in the negative electrode of the electrical storage device, decomposition of the electrolytic solution is further suppressed. As a result, the electrical storage device of the present invention displays high cycle characteristics.

DESCRIPTION OF EMBODIMENTS

Figure 1:
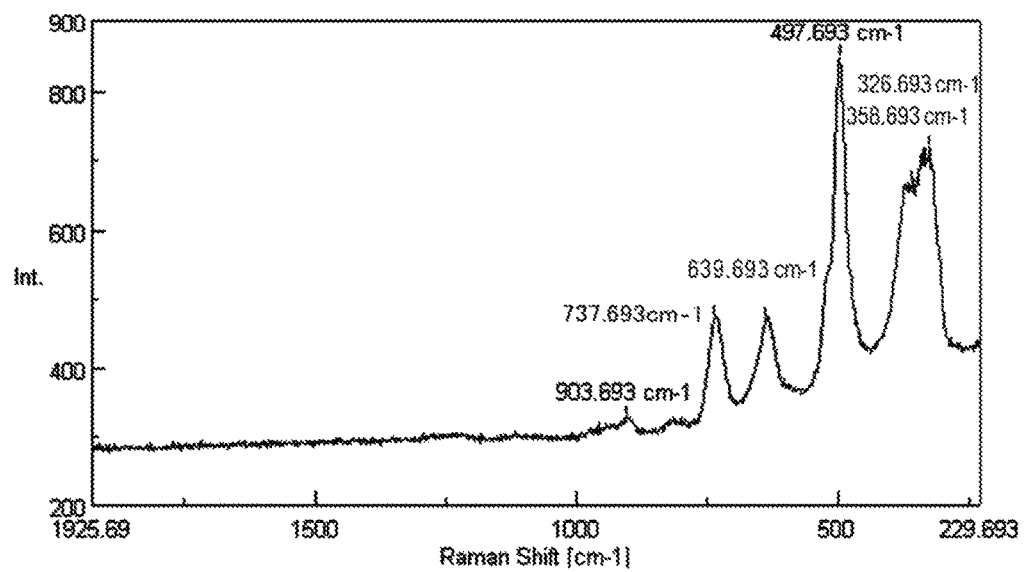
FIG. 1 is a Raman spectrum of a layered polysilane.
Figure 2:
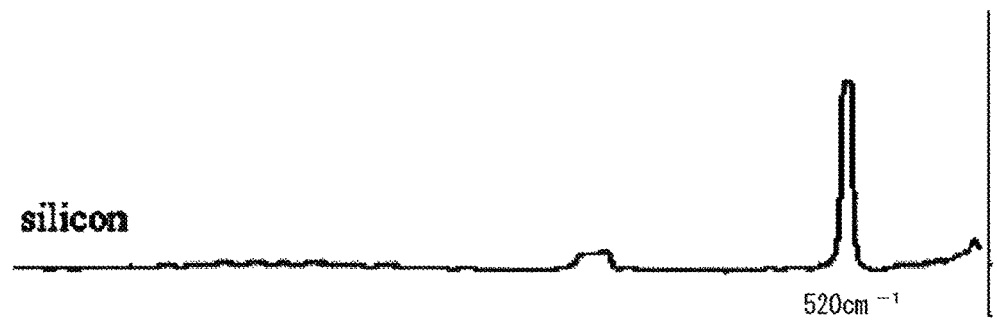
FIG. 2 is a Raman spectrum of a single-crystal silicon.

The present inventors conducted thorough research in the layered polysilane described in Non-Patent Literature 1 and Patent Literature 3, and focused on the Raman spectrum thereof. Generally in a Raman shift, a bond is known to be stronger when a shift toward the high frequency side is observed and is known to be more easily cut when a shift toward the low frequency side is observed. A Raman spectrum of the layered polysilane is shown in FIG. 1, and a Raman spectrum of a single-crystal silicon is shown in FIG. 2. Based on a comparison between FIGS. 1 and 2, a peak of a Si—Si bond observed at 520 $cm^{-1}$ in the single-crystal silicon was understood as to be shifted to the vicinity of 320 $cm^{-1}$ on the low frequency side in the layered polysilane.

Thus, by having a layered polysilane structure, since the bond between Si—Si becomes weak, forming nano silicon under mild condition is predicted to be possible. The present inventors discovered that a nano silicon material is obtained by heating the layered polysilane at a temperature higher than 100° C. under a non-oxidizing atmosphere. In the layered polysilane described in Non-Patent Literature 1, the basic skeleton is a layered polysilane represented by a composition formula of $(SiH)_n$ and having a structure in which multiple six-membered rings formed from silicon atoms are connected. By heating the layered polysilane at a temperature higher than 100° C. under a non-oxidizing atmosphere, a nano silicon material whose crystallite diameter is about 5 nm is obtained. When the heating is conducted at a temperature lower than 100° C., the structure of the layered polysilane is maintained without any changes, and the nano silicon is not obtained. Although the heating time is different depending on the heating temperature, one hour is sufficient if the heating is conducted at a temperature not lower than 500° C.

In addition, containing a large amount of $SiO_2$ component in the negative electrode active material is known to cause deterioration of initial characteristics. The layered polysilane described in Non-Patent Literature 1 and Patent Literature 3, although having a small BET specific surface area of about 20 $m^2/g$, has a large amount of contained oxygen, and thereby is not suitable as the negative electrode active material as described above.

A thorough research has revealed that, depending on the manufacturing conditions of the layered polysilane, the BET specific surface area and the amount of oxygen in the obtained layered polysilane change, and the BET specific surface area and the amount of oxygen in the nano silicon obtained by heating the layered polysilane also change. In Non-Patent Literature 1 and Patent Literature 3, the layered polysilane is obtained by causing a reaction between hydrogen chloride (HCl) and calcium disilicide ($CaSi_2$). Calcium disilicide ($CaSi_2$) forms a layered crystal in which a Ca atomic layer is inserted within the (111) plane of Si having a diamond structure, and the layered polysilane is obtained when calcium (Ca) is extracted through a reaction with an acid.

In the Raman spectrum for the layered polysilane, peaks of Raman shift exist at $341\pm10$ $cm^{-1}$, $360\pm10$ $cm^{-1}$, $498\pm10$ $cm^{-1}$, $638\pm10$ $cm^{-1}$, and $734\pm10$ $cm^{-1}$.

Using a mixture of hydrogen fluoride (HF) and hydrogen chloride (HCl) as the acid to extract Ca has been shown to increase the BET specific surface areas of, but reduce the amount of oxygen of, the obtained layered polysilane and nano silicon material. However, having an increase in the BET specific surface area is not preferable from the standpoint of an increase in the above described irreversible capacity, etc. In addition, the obtained nano silicon material aggregates and forms aggregated particles. Thus, a problem occurs regarding deterioration in cycle characteristics due to generation of SEI as the specific surface area increases, as a result of the aggregated particles turning into fine powder because of repeated expansion and contraction during charging and discharging in an electrical storage device.

Thus, the negative electrode active material of the present invention includes the complex particles formed of the nano silicon aggregated particles, and the composited carbon layer formed from an amorphous carbon and at least covering one portion of the aggregated particles. Although the nano silicon aggregated particles to be used may be obtained by heating the layered polysilane described in Non-Patent Literature 1 and Patent Literature 3; nano silicon aggregated particles obtained by heating a layered polysilane produced with the following method are preferably used.

Thus, a mixture of hydrogen fluoride (HF) and hydrogen chloride (HCl) is caused to react with calcium disilicide ($CaSi_2$). Calcium disilicide ($CaSi_2$) forms a layered crystal in which a Ca atomic layer is inserted among the (111) plane of Si having a diamond structure, and the layered polysilane is obtained when calcium (Ca) is extracted through a reaction with an acid.

In this production method, the mixture of hydrogen fluoride (HF) and hydrogen chloride (HCl) is used as the acid. By using hydrogen fluoride (HF), the $SiO_2$ component generated during synthesis or refining is etched, and although the BET specific surface area increases as a result, the amount of oxygen is reduced. Although a layered polysilane is obtained even when hydrogen fluoride (HF) is used alone, the obtained layered polysilane is not preferable since being highly active and is oxidized with a minute amount of air, but has an increased amount of oxygen. When hydrogen chloride (HCl) is used alone, similarly to that in Non-Patent Literature 1, only a layered polysilane having a large amount of oxygen is obtained.

The composition ratio of hydrogen fluoride (HF) and hydrogen chloride (HCl) is preferably within a range of HF/HCl=1/1 to 1/100 in mol ratio. Having an amount of hydrogen fluoride (HF) larger than that described in this ratio is not preferable since impurities such as $CaF_2$ and CaSiO-type are generated, and separating the layered polysilane from these impurities is difficult. Furthermore, when the amount of hydrogen fluoride (HF) becomes smaller than that described in this ratio, the etching action by HF becomes weak, and a large amount of oxygen remains in the layered polysilane in some cases.

The blend ratio of calcium disilicide ($CaSi_2$) and the mixture of hydrogen fluoride (HF) and hydrogen chloride (HCl) is preferably excessive for the acid than equivalency. Furthermore, the reaction is preferably conducted under vacuum or inert gas atmosphere. Using this production method has been shown to shorten the reaction time compared to that with the production method in Non-Patent Literature 1. Since having a reaction time that is too long causes the generation of $SiF_4$ as a result of additional reaction between Si and HF, a reaction time of about 0.25 to 24 hours is sufficient. The reaction proceeds easily even when the reaction temperature is room temperature.

Although $CaCl_2$ or the like is generated from the reaction, refinement of the layered polysilane is easy since $CaCl_2$ or the like is easily removed through rinsing with water.

By heating the produced layered polysilane under a non-oxidizing atmosphere at a temperature not lower than 100° C., nano silicon aggregated particles having a reduced BET specific surface area and less amount of oxygen is obtained. Examples of the non-oxidizing atmosphere include an inert gas atmosphere and a vacuum atmosphere. The inert gas is not specified in particular as long as the inert gas is such as nitrogen, argon, or helium, and does not contain oxygen.

The heating temperature is preferably within a range of 100° C. to 1000° C., and particularly preferably within a range of 400° C. to 600° C. The nano silicon is not generated when the temperature is lower than 100° C. A lithium ion secondary battery having, as the negative electrode active material, nano silicon aggregated particles formed particularly through heating at a temperature not lower than 400° C. has improved initial efficiency.

The size of Si crystallites of the nano silicon in the aggregated particles, when being used as an electrode active material of an electrical storage device, is within a range of preferably 0.5 nm to 300 nm, more preferably 1 nm to 100 nm, further preferably 1 nm to 50 nm, and particularly preferably 1 nm to 10 nm.

Although the amount of oxygen in the nano silicon aggregated particles obtained by heating the layered polysilane produced with the production method described in Non-Patent Literature 1 is as large as approximately 33%, the amount of oxygen in the nano silicon aggregated particles obtained by heating the layered polysilane produced with the production method described above is as small as 30% or less.

The negative electrode active material of the present invention includes the complex particles formed of the nano silicon aggregated particles having at least one portion thereof covered with the carbon layer formed from an amorphous carbon. The mean particle diameter $D_{50}$ of the aggregated particles is within a range of 0.2 μm to 30 μm, and the mean particle diameter $D_{50}$ of the complex particles is within a range of 0.5 μm to 40 μm. The mean particle diameter $D_{50}$ of the aggregated particles is particularly preferably not larger than 1 μm.

When the mean particle diameter $D_{50}$ of the aggregated particles is smaller than 0.2 μm, SEI is generated easily when being used in the negative electrode of an electrical storage device, since the specific surface area increases. Furthermore, since aggregation occurs easily, uniformly dispersing the aggregated particles in the complex particles becomes difficult. When the mean particle diameter $D_{50}$ of the aggregated particles is larger than 30 μm, the particle size of the complex particles becomes larger. As a result, coatability of the complex particles with respect to a current collector deteriorates, and, when being used in the negative electrode of an electrical storage device, the cycle characteristics deteriorate because of the aggregated particles turning into fine powder.

When the mean particle diameter $D_{50}$ of the complex particles is smaller than 0.5 μm, the specific surface area becomes large, and, when being used in the negative electrode of an electrical storage device, initial efficiency deteriorates since SEI increases. Furthermore, when the mean particle diameter $D_{50}$ of the complex particle becomes larger than 30 μm, coatability of the complex particles with respect to a current collector deteriorates, and, when being used in the negative electrode of an electrical storage device, the cycle characteristics deteriorate because the aggregated particles turn into fine powder.

The carbon layer formed from an amorphous carbon covers at least one portion of the aggregated particles. The carbon layer provides an advantageous effect of reinforcing the aggregated particles. Although conductive additives such as graphite, acetylene black, and Ketchen black are used in the negative electrode in some cases, carbon in these conductive additives is crystalline, not amorphous.

The thickness of the carbon layer composited when covering the nano silicon aggregated particles is preferably within a range of 1 to 100 nm and further preferably within a range of 5 to 50 nm. When the thickness of the carbon layer is too small, obtaining the advantageous effect becomes difficult, whereas when the carbon layer is too thick, the battery resistance increases and charging and discharging become difficult in some cases. A structure in which the nano silicon aggregated particles are dispersed within a matrix of the carbon layer is preferable.

The composition ratio of silicon and carbon in the complex particles is preferably Si/C=2/1 to 20/1 in weight ratio. Having a Si/C smaller than 2/1 is not suitable for practical use since the initial capacity becomes low when the complex particles are used in the negative electrode of an electrical storage device. Furthermore, when the Si/C is larger than 20/1, the advantageous effect of compositing the carbon layer is not obtained. The weight ratio Si/C is particularly preferably within a range of 2/1 to 6/1.

When forming the carbon layer, simply mixing an amorphous carbon produced separately by some sort of method with the nano silicon aggregated particles causes the negative electrode active material to be heterogeneous, and covering at least one portion of the aggregated particles by carbon becomes difficult. When the following production method is used instead, at least one portion of the aggregated particles is covered with the amorphous carbon with certainty, and a homogeneous negative electrode active material is produced.

A first production method configured to produce the negative electrode active material of the present invention includes the following steps to be performed in the following order: an aggregated particle formation step of obtaining nano silicon aggregated particles by heating a layered polysilane represented by a composition formula of $(SiH)_n$ and having a structure in which multiple six-membered rings formed from silicon atoms are connected; a polymerization step of polymerizing, in a state in which the aggregated particles and an aromatic heterocyclic compound are mixed, the aromatic heterocyclic compound; and a carbonization step of carbonizing a polymer of the aromatic heterocyclic compound.

The aggregated particle formation step of forming the nano silicon aggregated particles is the same as that described above.

At the polymerization step, the aromatic heterocyclic compound is polymerized in the state in which the nano silicon aggregated particles and the aromatic heterocyclic compound are mixed. With this, the polymer of the aromatic heterocyclic compound is obtained in a state of being adhered to the nano silicon aggregated particles. Examples of compounds that may be used as the aromatic heterocyclic compound include polymerizable compounds such as five-membered ring aromatic heterocyclic compounds such as furan, pyrrole, thiophene, imidazole, pyrazole, oxazole, isoxazole, thiazole, and isothiazole, and polycyclic aromatic heterocyclic compound such as indole, benzimidazole, benzofuran, and purine.

Although various types of polymerization methods may be used for polymerizing these compounds, when pyrrole or the like is to be used, a method of applying heat in the presence of a polymerization catalyst such as concentrated hydrochloric acid or iron trichloride is simple to use. When iron trichloride is used in particular, the advantageous effect of increasing the initial capacity when being used in the electrical storage device is obtained since polymerization can be conducted in a nonaqueous atmosphere and oxidization of Si is suppressed.

At the carbonization step, the polymer of the aromatic heterocyclic compound is carbonized in the state of being mixed with the nano silicon aggregated particles. Although this step is performed sufficiently as long as the heating is conducted under an inert atmosphere at a temperature not lower than 100° C. similarly to when the nano silicon aggregated particles are produced; the heating is preferably conducted at a temperature not lower than 400° C. The aromatic heterocyclic compound, when being polymerized, undergoes carbonization without evaporating even when heated, and a complex in which the carbon layer formed from an amorphous carbon is bound to the surface of the nano silicon aggregated particles is obtained. Without performing the polymerization step, if the heating is conducted in the state in which the nano silicon aggregated particles and the aromatic heterocyclic compound are mixed, the aromatic heterocyclic compound evaporates and carbonizing the aromatic heterocyclic compound becomes difficult.

With the production method described above, productivity is low since steps for polymerization and refinement, etc., are required. In addition, the production method has a problem regarding difficulty in forming the complex in which the carbon layer is formed uniformly. Thus, a second production method of the present invention includes the following steps to be performed in the following order: an aggregated particle formation step of obtaining nano silicon aggregated particles by heating a layered polysilane represented by a composition formula of $(SiH)_n$ and having a structure in which multiple six-membered rings formed from silicon atoms are connected; a compositing step of mixing a resin solution and the aggregated particles and removing a solvent therefrom; and a carbonization step of carbonizing a resin thereof. With this production method, by optimally selecting the resin, the carbon layer formed from an amorphous carbon is easily formed. In particular, by using a polymer compound in advance as the resin, the polymerization step is shortened and unevenness caused during polymerization is reduced.

The aggregated particle formation step of forming the nano silicon aggregated particles is the same as that described above.

The compositing of the resin and the aggregated particles is conducted by mixing the resin solution and the aggregated particles, and removing the solvent. As the resin used as a carbon precursor, an easily graphitizable material or a hardly graphitizable material is preferably used, and a resin having a high carbonization rate is more preferable. Examples of resins having a high carbonization rate include polycarbonate whose material is bisphenol A, an epoxy resin, and phenol resins whose material is phenol; and phenol resins having a particularly high carbonization rate is particularly preferable. As the solvent of the resin solution, any solvent capable of dissolving the resin may be used. In order to obtain composite particles with fewer flaws, the aggregated particles are preferably sufficiently mixed and dispersed uniformly in the resin solution.

Although the carbonization step is performed sufficiently as long as the heating is conducted under an inert atmosphere at a temperature not lower than 100° C. similarly to when the nano silicon aggregated particles are produced; the heating is preferably conducted at a temperature not lower than 400° C. When a thermosetting resin is used as the resin, carbonization may be conducted after the resin is heated and cured. Furthermore, the resin may be thermally cured at a low temperature in advance and then heated at a high temperature for carbonization, or the resin may be thermally cured in the carbonization step while the temperature is being increased.

In a Raman spectrum of the amorphous carbon, peaks appear at G-band (around 1590 cm$^{-1}$) and D-band (around 1350 cm$^{-1}$). A peak at G-band is derived from graphite and a peak at D-band is derived from a defect. Thus, having a higher G/D ratio, which is a ratio of G-band and D-band, means having higher crystallinity.

The experiments conducted by the present inventors have shown that the G/D ratio of the produced amorphous carbon is different depending on the calcination temperature in the carbonization step, and the G/D ratio becomes higher when the calcination temperature is higher. In addition, the experiments have shown that having a low G/D ratio results in deteriorated initial efficiency when being used in the electrical storage device. Thus, regarding the carbon in the carbon layer in the complex, the G/D ratio which is the ratio of G-band and D-band is preferably not lower than 0.2 in a Raman spectrum. By using such a complex in the negative electrode active material, the irreversible capacity in the electrical storage device is reduced and the initial efficiency improves. In order to obtain a G/D ratio not lower than 0.2, the calcination temperature is preferably not lower than 500° C. in the carbonization step. When the calcination temperature is too high, the nano silicon becomes inactive, and the initial efficiency and the initial capacity are reduced when being used in the electrical storage device. Thus, the calcination temperature is preferably lower than 1100° C.

Carbon formed at the carbonization step was shown to have a different characteristic X-ray spectrum depending on the type of carbon source. Characteristic X-rays are generated when an electron in an occupying orbit at the outer shell transitions to a pore formed in an inner shell orbit. The energy (hv) of the characteristic X-rays depends on the energy difference between the inner shell and the outer shell. In cases with carbon, a peak of hv appears at around 276 to 282 eV because of the transition of electrons from the L shell to the more inner K shell at the valence band. The peak is generally referred to as CKα spectrum. In cases with carbon formed using a phenol resin, an epoxy resin, a polycarbonate, or the like as the carbon source, a characteristic peak appears at around hv=279.5 to 281.0 eV, and the height of the peak differs depending on the difference in the type of the resin. Carbon formed from furan does not has this peak, but has a characteristic peak at around hv=279 to 279.5 eV. Here, (h) is the Planck's constant [6.62606957×10$^{-34}$ m$^2$kg/s], and (v) is the frequency [Hz] of irradiated radiation.

In a CKα spectrum of characteristic X-rays generated through irradiation of electron beams or X-rays, the carbon of the carbon layer in the complex preferably has a peak (A) derived from sp$^2$ orbit at around hv=277.5 to 279.5 eV (h: Planck's constant, v: frequency), and a peak (B) at around hv=279.5 to 281.0 eV. When the ratio (peak (B)/peak (A)) of the height of the peak (B) with respect to the height of the peak (A) is not lower than 0.92, the carbon is carbon derived from a phenol resin, and the electrical storage device provided with the complex containing the carbon achieves particularly excellent initial efficiency and initial capacity.

In the two production methods described above, the nano silicon aggregated particles formed at the aggregated particle formation step aggregate with each other and form bulky aggregated particles. When the carbonization step is performed in such a state, the carbon layer is formed on the surface of, but almost not in the inside of, the bulky aggregated particles of the obtained complex particles. Thus, when the complex particles are ground, the contained bulky aggregated particles are ground and the probability of having a fracture surface of the aggregated particles being exposed on the surface of the complex particle increases. In the electrical storage device using such complex particles in the negative electrode, the advantageous effect of suppressing decomposition of the electrolytic solution becomes less, and cycle characteristics deteriorate in some cases.

Thus, in the production methods of the present invention, a grinding step of grinding the aggregated particles to a mean particle diameter $D_{50}$ of not larger than 30 μm into fine aggregated particles is performed after the aggregated particle formation step, and then the carbonization step is performed. By doing so, the carbon layer is easily formed on all surfaces of the fine aggregated particles. Even when grinding of the complex particle is required after the carbonization, grinding of even the fine aggregated particles is suppressed since fractures are mainly within the carbon layer, and the probability of having a fracture surface of the aggregated particles being exposed on the surface of the complex particle becomes low. Thus, in the electrical storage device using such complex particles in the negative electrode, the advantageous effect of suppressing decomposition of the electrolytic solution increases, and cycle characteristics greatly improve.

The grinding step can be performed by using various types of grinders known in the art such as a ball mill, a roll mill, a jet mill, a sand mill, and an impact mill. These types of grinders can be used even when the complex particles are to be ground after the carbonization.

<Negative Electrode of Electrical Storage Device>

The negative electrode of, for example, a nonaqueous secondary battery is produced by using the negative electrode active material of the present invention by: applying, on the current collector using a method such as roll coating method, dip coating method, doctor blade method, spray coating method, or curtain coating method, a slurry obtained through adding and mixing a powder of the negative electrode active material, the conductive additive such as a carbon powder, a binder, and a proper amount of an organic solvent; and drying or curing the binder.

Although the binder is demanded to bind the active material or the like with the smallest possible amount, the added amount is preferably 0.5 wt % to 50 wt % of the total amount of the active material, the conductive additive, and the binder. Moldability of an electrode deteriorates when the amount of the binder is less than 0.5 wt %, whereas energy density of an electrode decreases when the amount of the binder is more than 50 wt %.

Examples of the binder include polyvinylidene difluoride (PVdF), polytetrafluoroethylene (PTFE), styrene-butadiene rubber (SBR), polyimide (PI), polyamide-imide (PAI), carboxymethyl cellulose (CMC), polyvinyl chloride (PVC), methacrylic resin (PMA), polyacrylonitrile (PAN), modified polyphenylene oxide (PPO), polyethylene oxide (PEO), polyethylene (PE), polypropylene (PP), and polyacrylic acid (PAA), etc.

When polyvinylidene difluoride is used as the binder, the potential of the negative electrode is reduced and voltage of the electrical storage device improves. Furthermore, using polyamide-imide (PAI) orpolyacrylic acid (PAA) as the binder improves initial efficiency and discharge capacity.

The current collector refers to a fine electron conductor that is chemically inert for continuously sending a flow of current to the electrode during discharge or charging. The current collector may be used in the form of a foil, a plate, or the like. However, the form is not particularly limited as long as the form is in accordance with the purpose. As the current collector, for example, a copper foil or an aluminum foil is suitably used.

With respect to the negative electrode active material of the present invention, a negative electrode active material known in the art such as graphite, hard carbon, silicon, carbon fibers, tin (Sn), and silicon oxides may be mixed. Among those described above, a silicon oxide represented by $SiO_x$ ($0.3 \leq x \leq 1.6$) is particularly preferable. Each particle of a powder of this silicon oxide is formed of $SiO_x$ derived from decomposition into fine Si and $SiO_2$ covering the Si as a result of a disproportionation reaction. When x is lower than the lower limit value, the volume change during charging and discharging becomes too large and the cycle characteristics deteriorate since the Si ratio becomes high. Furthermore, when x is higher than the upper limit value, the energy density is reduced since the Si ratio becomes low. A range of $0.5 \leq x \leq 1.5$ is preferable, and a range of $0.7 \leq x \leq 1.2$ is further preferable.

General, nearly all SiO molecules are said to disproportionate and separate into two phases at a temperature of not lower than 1000° C. in an oxygen-less environment. Specifically, by heating a material silicon oxide powder containing an amorphous SiO powder at 1000 to 1200° C. for 1 to 5 hours in an inert atmosphere such as under vacuum or in an inert gas, a silicon oxide powder including two phases, i.e., an amorphous $SiO_2$ phase and a crystalline Si phase, is obtained.

Furthermore, as the silicon oxide, a material obtained by compositing 1 to 50 mass % of a carbon material with respect to $SiO_x$ may be used. By compositing the carbon material, cycle characteristics improve. When the composited amount of the carbon material is less than 1 mass %, the advantageous effect regarding the improvement of conductivity is not obtained; whereas when the composited amount is more than 50 mass %, the relative proportion of $SiO_x$ becomes less and negative-electrode capacity reduces. The composited amount of the carbon material with respect to $SiO_x$ is preferably in a range of 5 to 30 mass % and further preferably within a range of 5 to 20 mass %. CVD or the like may be used for compositing the carbon material with respect to $SiO_x$.

The mean particle diameter of the silicon oxide powder is preferably within in a range of 1 µm to 10 µm. When the mean particle diameter is larger than 10 µm, charging/discharging characteristic of the nonaqueous secondary battery deteriorates; whereas when the mean particle diameter is smaller than 1 µm, the charging/discharging characteristic of the nonaqueous secondary battery similarly deteriorates in some cases since bulky particles are obtained through aggregation.

The conductive additive is added for increasing conductivity of the electrode. As the conductive additive, carbonaceous fine particles such as carbon black, graphite, acetylene black (AB), Ketchen black (KB), and vapor grown carbon fiber (VGCF) may be used singly or in a combination of two or more. Although the usage amount of the conductive additive is not limited in particular, for example, about 20 to 100 parts by mass may be used with respect to 100 parts by mass of the active material. When the amount of the conductive additive is less than 20 parts by mass, an efficient conducting path is not formed; whereas when the amount is more than 100 parts by mass, moldability of the electrode worsens and energy density of the electrode becomes low. When the silicon oxide composited with the carbon material is used as the active material, the added amount of the conductive additive may be reduced or may be zero.

The organic solvent is not limited in particular, and a mixture of multiple solvents may be used. As the organic solvent, N-methyl-2-pyrrolidone and a mixed solvent of N-methyl-2-pyrrolidone and an ester based solvent (ethyl acetate, n-butyl acetate, butyl-cellosolve acetate, butyl carbitol acetate, etc.) or a glyme based solvent (diglyme, triglyme, tetraglyme, etc.) are particularly preferable.

When the electrical storage device of the present invention is a lithium ion secondary battery, lithium may be predoped on the negative electrode. For the doping of the negative electrode with lithium, for example, an electrode forming method of assembling a half cell using metal lithium as a counter electrode, and electrochemically conducting lithium doping may be used. The degree of lithium doping is not particularly limited.

When the electrical storage device of the present invention is a lithium ion secondary battery, a not-particularly limited positive electrode, electrolytic solution, or separator known in the art may be used. Any positive electrode may be used as long as the positive electrode is one that is usable in a nonaqueous secondary battery. The positive electrode includes a current collector, and a positive electrode active material layer bound on the current collector. A positive electrode active material layer contains the positive electrode active material and the binder, and may further contain a conductive additive. The positive electrode active material, the conductive additive, and the binder are not particularly limited, and those usable in a nonaqueous secondary battery may be used.

Examples of the positive electrode active material include metal lithium, $LiCoO_2$, $LiNi_{1/3}Co_{1/3}Mn_{1/3}O_2$, $Li_2MnO_3$, and sulfur, etc. As the current collector, one that is commonly used for the positive electrode of a lithium ion secondary battery such as aluminum, nickel, and stainless steel may be used. As the conductive additive, one that is similar to that described above in relation to the negative electrode may be used.

The electrolytic solution is obtained by dissolving a lithium metal salt, which is an electrolyte, in the organic solvent. The electrolytic solution is not limited in particular. As the organic solvent, one or more types selected from aprotic organic solvents such as, for example, propylene carbonate (PC), ethylene carbonate (EC), dimethyl carbonate (DMC), diethyl carbonate (DEC), and ethyl methyl carbonate (EMC) may be used. As the electrolyte to be dissolved, a lithium metal salt that is soluble to the organic solvent, such as $LiPF_6$, $LiBF_4$, $LiAsF_6$, $LiI$, $LiClO_4$, and $LiCF_3SO_3$ may be used.

As the electrolytic solution, for example, a solution obtained by dissolving a lithium metal salt such as $LiClO_4$, $LiPF_6$, $LiBF_4$, or $LiCF_3SO_3$ in an organic solvent such as ethylene carbonate, dimethyl carbonate, propylene carbonate, or dimethyl carbonate at a concentration of about 0.5 mol/L to 1.7 mol/L may be used.

The separator is not particularly limited as long as the separator is one usable in a nonaqueous secondary battery. The separator is configured to separate the positive electrode and the negative electrode to retain the electrolytic solution, and thin microporous film of polyethylene, polypropylene, or the like may be used for the separator.

When the electrical storage device of the present invention is a nonaqueous secondary battery, the form of the nonaqueous secondary battery is not particularly limited, and various forms such as a cylinder type, a laminated type, and a coin type, etc., may be used. No matter which form is used, a battery is formed by: making an electrode assembly by interposing the separator between the positive electrode and the negative electrode; respectively connecting, using current collection leads or the like, the positive electrode current collector to a positive electrode external terminal and the negative electrode current collector to a negative electrode external terminal; and sealing the electrode assembly together with the electrolytic solution in a battery case.

In the following, embodiments of the present invention will be described specifically by means of Examples and Comparative Examples.

Example 1

Aggregated Particle Formation Step

A mixed solution of 7 ml of an HF aqueous solution having a concentration of 46 mass % and 56 ml of an HCl aqueous solution having a concentration of 36 mass % was set to a temperature of 0° C. in an ice bath, 3.3 g of calcium disilicide ($CaSi_2$) was added thereto in an argon gas current, and the mixed solution was stirred. After confirming that foaming has ended, the mixed solution was brought to room temperature, further stirred for 2 hours at room temperature, and, after 20 ml of distilled water was added thereto, further stirred for 10 minutes. A yellow powder was observed as being suspended in the solution.

Figure 3:
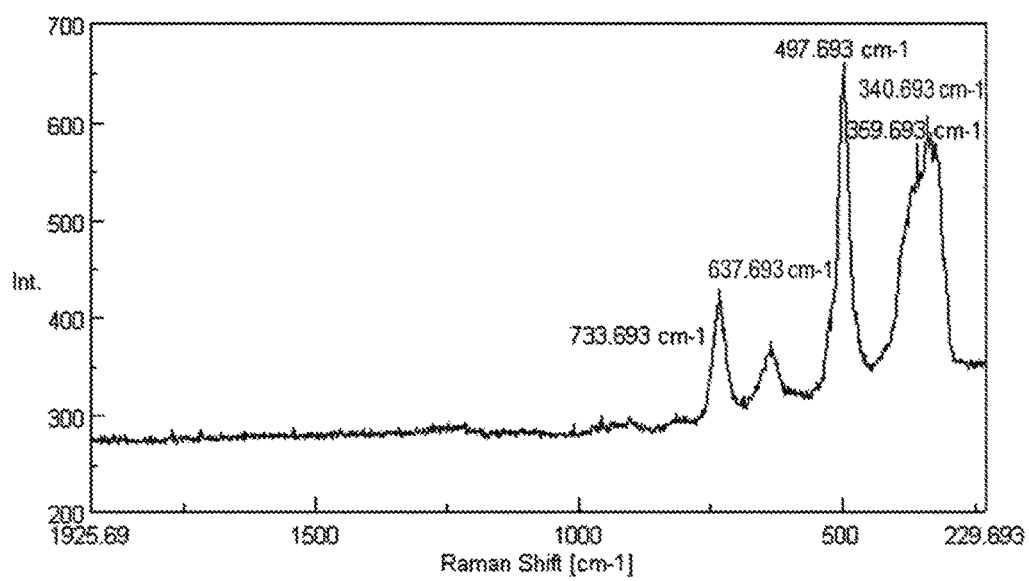
FIG. 3 is a Raman spectrum of a layered polysilane according to Example 1.

The obtained mixed solution was filtered. A residue obtained therefrom was rinsed with 10 ml of distilled water, rinsed with 10 ml of ethanol, and vacuum dried to obtain 2.5 g of a layered polysilane. A Raman spectrum of that is shown in FIG. 3. Peaks of Raman shift existed at $341\pm10$ $cm^{-1}$, $360\pm10$ $cm^{-1}$, $498\pm10$ $cm^{-1}$, $638\pm10$ $cm^{-1}$, and $734\pm10$ $cm^{-1}$. The layered polysilane was heated to obtain nano silicon aggregated particles.

Grinding Step

Although the obtained nano silicon aggregated particles had a mean particle diameter $D_{50}$ of approximately 30 μm, bulky aggregated particles were formed through further aggregation of the aggregated particles. Thus, the particles were ground using a ball mill. 100 g of zirconia balls having a diameter of 4 mm was used with respect to 1 g of the nano silicon aggregated particles, and the grinding was conducted for 24 hours at 70 rpm. The mean particle diameter $D_{50}$ of the obtained fine aggregated particles was 1.5 μm.

Carbonization Step

With respect to 1 g of the obtained fine aggregated particles, 0.86 g of a resol-type phenolic resin solution (solid content: 58 mass %) was added (loaded weight ratio Si/C=2/1), and the mixture was stirred thoroughly. After the solvent was removed therefrom, the phenol resin was heated at 120° C. for 1 hour under reduced pressure to cure the phenol resin, and then carbonized through baking for 20 minutes at 900° C. in argon gas. Si/C weight ratio calculated from the weight of the recovered powder and the loaded amount of the layered polysilane was 4/1.

Figure 4:
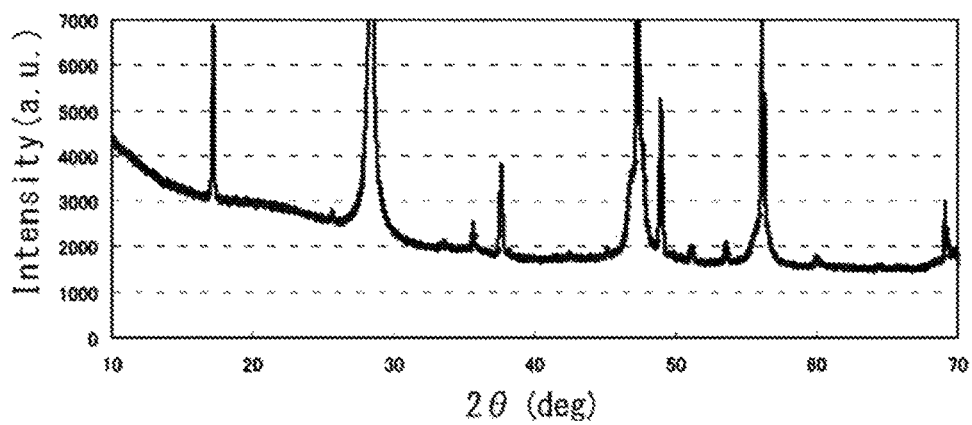
FIG. 4 is an XRD spectrum of complex particles according to Example 1.

Measurement of X-ray diffraction (XRD measurement) using CuKα radiation against the obtained complex particles was conducted. The result is shown in FIG. 4. From the XRD measurement, a halo that is considered to be derived from fine particles of Si was observed. The crystallite diameter of the fine particles of Si calculated in accordance with Scherrer's equation from the half width of a diffraction peak of the (111) plane in the X-ray diffraction measurement result was approximately 3 nm. With the complex particles, since a peak of 2θ=26° (crystalline carbon peak) was not observed, the carbon contained in the complex particles is understood as to be amorphous.

The obtained complex particles were ground by using a ball mill. 100 g of zirconia balls having a diameter of 4 mm was used with respect to 1 g of the complex particles, and the grinding was conducted for 2 hours at 70 rpm. The mean particle diameter $D_{50}$ of the obtained complex fine particles was 5.9 μm.

A slurry was prepared by mixing 85 parts by mass of a powder of the obtained complex fine particles, 5 parts by mass of acetylene black, and 33 parts by mass of a binder solution. As the binder solution, a solution in which a polyamide-imide (PAI) resin was dissolved in N-methyl-2-pyrrolidone (NMP) at 30 mass % was used. The slurry was applied on the surface of an electrolytic copper foil (current collector) having a thickness of approximately 20 μm by using a doctor blade to form a negative electrode active material layer on the copper foil. Then, the current collector and the negative electrode active material layer were adhered firmly and joined by using a roll press machine. The obtained joined object was vacuum dried at 100° C. for 2 hours to form a negative electrode in which the thickness of the negative electrode active material layer was 16 μm.

A lithium ion secondary battery (half-cell) was produced by using, as an evaluation electrode, the negative electrode produced from the procedure described above. A metal lithium foil (thickness: 500 μm) was used as a counter electrode.

The counter electrode and the evaluation electrode were respectively cut to have diameters of 13 mm and 11 mm, and had a separator (glass filter manufactured by the Hoechst Celanese Corp., and "Celgard 2400" manufactured by Celgard LLC.) interposed therebetween to form an electrode assembly battery. The electrode assembly battery was housed in a battery case (member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and the battery case was sealed to obtain a lithium ion secondary battery.

Example 2

A lithium ion secondary battery was obtained similarly to Example 1 except for using complex particles prepared similarly to Example 1 except for setting the grinding time in the grinding step to 12 hours, and setting the grinding time after the carbonization step to 2 hours. The mean particle diameter $D_{50}$ of the fine aggregated particles obtained at the grinding step was 3.0 μm, and the mean particle diameter $D_{50}$ of the prepared complex particles was 4.2 μm.

Example 3

A lithium ion secondary battery was obtained similarly to Example 1 except for using complex particles prepared similarly to Example 1 except for setting the grinding time in the grinding step to 2 hours and setting the grinding time after the carbonization step to 2 hours. The mean particle diameter $D_{50}$ of the fine aggregated particles obtained at the grinding step was 11.0 μm, and the mean particle diameter $D_{50}$ of the prepared complex particles was 4.8 μm.

Comparative Example 1

A lithium ion secondary battery was obtained similarly to Example 1 except for using complex particles prepared similarly to Example 1 except for not performing the grinding step and setting the grinding time after the carbonization step to 2 hours. The mean particle diameter $D_{50}$ of the fine aggregated particles obtained at the grinding step was 34.0 μm, and the mean particle diameter $D_{50}$ of the prepared complex particles was 5.0 μm.

Comparative Example 2

A lithium ion secondary battery was obtained similarly to Example 1 except for using complex particles prepared similarly to Example 1 except for setting the grinding time in the grinding step to 24 hours and not performing the grinding after the carbonization step. The mean particle diameter $D_{50}$ of the fine aggregated particles obtained at the grinding step was 1.5 μm, and the mean particle diameter $D_{50}$ of the prepared complex particles was 42.0 μm.

Comparative Example 3

A lithium ion secondary battery was obtained similarly to Example 1 except for using complex particles prepared similarly to Example 1 except for not performing the grinding of the grinding step and not performing the grinding after the carbonization step. The mean particle diameter $D_{50}$ of the fine aggregated particles obtained at the grinding step was 32.0 μm, and the mean particle diameter $D_{50}$ of the prepared complex particles was 41.0 μm.

Evaluation of Coatability

The negative electrodes formed in Examples 1 to 3 and Comparative Examples 1 to 3 were evaluated for surface smoothness through a visual observation. The results are shown in Table 1. The surface smoothness was evaluated as "o" for those uniformly coated with no unevenness, and "x" for those that were uneven and not uniform, having large concavities and convexities, or having cracks, etc.

<Battery Characteristic Test>

By using the lithium ion secondary batteries of Examples 1 to 3 and Comparative Examples 1 to 3, discharge capacity obtained when discharging was conducted with a current of 0.2 mA was measured, and charge capacity (initial capacity) obtained when charging was conducted with a current of 0.2 mA and a temperature of 25° C. was measured. An initial efficiency (charge capacity/discharge capacity) was calculated.

By using each of the lithium ion secondary batteries, a cycle test of repeating, for 50 times, a cycle of: discharging at a temperature of 25° C. with a current of 0.2 mA until the voltage of the evaluation electrode with respect to that of the counter electrode reached 0.01 V; after 10 minutes, charging at a temperature of 25° C. with a current of 0.2 mA until the voltage of the evaluation electrode with respect to that of the counter electrode reached 1 V; and pausing for 10 minutes was performed. A value of 100×(charge capacity at 50-th cycle)/(charge capacity at first cycle) was calculated as a capacity retention rate. The results are shown in Table 1.

TABLE 1

| | Aggregated particle $D_{50}$ | Complex particle $D_{50}$ | Coatability | Initial capacity (mAh/g) | Initial efficiency (%) | Capacity retention rate (%) |
|---|---|---|---|---|---|---|
| Example 1 | 1.5 μm | 5.9 μm | o | 1220 | 76 | 91 |
| Example 2 | 3.0 μm | 4.2 μm | o | 1120 | 72 | 92 |
| Example 3 | 11.0 μm | 4.8 μm | o | 1230 | 77 | 90 |
| Comparative Example 1 | 34.0 μm | 5.0 μm | o | 1160 | 74 | 65 |
| Comparative Example 2 | 1.5 μm | 42.0 μm | x | 1120 | 67 | 80 |
| Comparative Example 3 | 32.0 μm | 41.0 μm | x | 1100 | 63 | 60 |

Table 1 shows that coatability and initial efficiency worsen when the mean particle diameter $D_{50}$ of the complex particles is larger than 40.0 μm. In Comparative Example 1, although excellent coatability and initial efficiency were obtained since the mean particle diameter $D_{50}$ of the complex particles was as small as 5.0 μm, the capacity retention rate was low and cycle characteristics were inferior. The reason may be that, since the mean particle diameter $D_{50}$ of the aggregated particles was as large as 34.0 μm, the aggregated particles themselves were also ground at the grinding step for the complex particles after the carbonization step, and the proportion of the fracture surfaces of the nano silicon aggregated particle being exposed on the surfaces of the ground complex particles became large, and thereby decomposition of the electrolytic solution and generation of SEI have occurred during the cycle test.

Thus, the results show that, when the complex particles that has a mean particle diameter D50 within a range of 0.5 μm to 40 μm and that includes the nano silicon aggregated particles having a mean particle diameter D50 within a range of 0.2 μm to 30 μm were used in the negative electrode active material; coatability and initial efficiency improved, and cycle characteristics significantly improved.

INDUSTRIAL APPLICABILITY

The electrical storage device of the present invention can be utilized as secondary batteries, electric double layer capacitors, lithium ion capacitors, and the like. In addition, the electrical storage device of the present invention is useful as nonaqueous secondary batteries utilized for driving motors of electric vehicles and hybrid automobiles and for personal computers, portable communication devices, home appliance, office instrument, industrial instrument, and the like. The electrical storage device of the present invention can be suitably used particularly for driving motors of electric vehicles and hybrid automobiles requiring large capacity and large output.

The invention claimed is:

1. A negative electrode active material comprising complex particles formed of: nano silicon aggregated particles produced by heating a layered polysilane having a basic skeleton represented by a composition formula of $(SiH)_n$ and having a structure in which multiple six-membered rings formed from silicon atoms are connected; and a composited carbon layer formed from an amorphous carbon and only covering an outer portion of the aggregated particles, wherein a mean particle diameter $D_{50}$ of the aggregated particles is within a range of 0.2 μm to 30 μm, and a mean particle diameter $D_{50}$ of the complex particles is within a range of 0.5 μm to 40 μm.

2. The negative electrode active material according to claim 1, wherein the mean particle diameter $D_{50}$ of the aggregated particles is not larger than 1 μm.

3. The negative electrode active material according to claim 1, wherein in a Raman spectrum of the layered polysilane, peaks of Raman shift exist at 341±10 $cm^{-1}$, 360±10 $cm^{-1}$, 498±10 $cm^{-1}$, 638±10 $cm^{-1}$, and 734±10 $cm^{-1}$.

4. The negative electrode active material according to claim 1, wherein the nano silicon of the aggregated particles has a crystallite diameter of 1 to 50 nm calculated in accordance with Scherrer's equation from a half width of a diffraction peak of (111) plane obtained from a result of a measurement of X-ray diffraction.

5. The negative electrode active material according to claim 1, wherein carbon forming the carbon layer lacks a peak in an XRD chart.

6. The negative electrode active material according to claim 1, wherein a composition ratio of silicon and carbon is Si/C=2/1 to 20/1 in weight ratio.

7. The negative electrode active material according to claim 1, wherein the complex particles include composite particles formed of a matrix containing the amorphous carbon and the aggregated particles dispersed in the matrix.

8. The negative electrode active material according to claim 7, wherein, in the composite particles, surfaces of the aggregated particles are enclosed within the matrix without being exposed from the composite particles.

9. The negative electrode active material according to claim 1, wherein the carbon of the carbon layer includes carbon derived from a phenol resin.

10. An electrical storage device comprising a negative electrode that includes the negative electrode active material according to claim 1.

11. The electrical storage device according to claim 10, wherein the electrical storage device is a lithium ion secondary battery.

12. A method for producing a negative electrode active material, the method comprising following steps to be performed in following order:
an aggregated particle formation step of obtaining nano silicon aggregated particles by heating a layered polysilane having a basic skeleton represented by a composition formula of $(SiH)_n$ and having a structure in which multiple six-membered rings formed from silicon atoms are connected;
a grinding step of grinding the aggregated particles to a mean particle diameter $D_{50}$ of not larger than 30 μm into fine aggregated particles; and
a carbonization step of mixing only the fine aggregated particles and a resin solution containing a solvent and a resin, removing the solvent, and carbonizing the resin.

13. The method for producing the negative electrode active material according to claim 12, wherein the resin is a phenol resin.

14. The method for producing the negative electrode active material according to claim 12, wherein the carbonization step is performed with heating at 600° C. to 1000° C.

15. The method for producing the negative electrode active material according to claim 12, wherein the layered polysilane is obtained from a reaction between calcium disilicide and a mixture of hydrogen fluoride (HF) and hydrogen chloride (HCl).

16. The method for producing the negative electrode active material according to claim 12, wherein in the aggregated particle formation step, heating of the layered polysilane is conducted under a non-oxidizing atmosphere at a temperature not lower than 400° C.

17. A negative electrode active material comprising complex particles formed of: nano silicon aggregated particles produced by heating a layered polysilane that shows, in a Raman spectrum, peaks of Raman shift at 341±10 $cm^{-1}$, 360 10 $cm^{-1}$, 498±10 $cm^{-1}$, 638±10 $cm^{-1}$, and 734±10 $cm^{-1}$; and a composited carbon layer formed from an amorphous carbon and only covering an outer portion of the aggregated particles, wherein a mean particle diameter $D_{50}$ of the aggregated particles is within a range of 0.2 μm to 30 μm, and a mean particle diameter $D_{50}$ of the complex particles is within a range of 0.5 μm to 40 μm.

18. A negative electrode active material comprising
complex particles consisting of: nano silicon aggregated
   particles produced by heating a layered polysilane
   having a basic skeleton represented by a composition
   formula of $(SiH)_n$ and having a structure in which
   multiple six-membered rings formed from silicon
   atoms are connected; and a composited carbon layer
   formed from an amorphous carbon and at least covering
   one portion of the aggregated particles, wherein
a mean particle diameter $D_{50}$ of the aggregated particles
   is within a range of 0.2 μm to 30 μm, and a mean
   particle diameter $D_{50}$ of the complex particles is within
   a range of 0.5 μm to 40 μm.

* * * * *

UNITED STATES PATENT AND TRADEMARK OFFICE
CERTIFICATE OF CORRECTION

PATENT NO. : 10,333,139 B2  
APPLICATION NO. : 15/106397  
DATED : June 25, 2019  
INVENTOR(S) : Takeshi Kondo et al.

Page 1 of 1

It is certified that error appears in the above-identified patent and that said Letters Patent is hereby corrected as shown below:

In Claim 3, at Column 18, Line 40:  
Delete "360 10 $cm^{-1}$" and insert --360 ± 10 $cm^{-1}$--.

Signed and Sealed this  
Eighth Day of October, 2019

Andrei Iancu  
*Director of the United States Patent and Trademark Office*